Oct. 16, 1934.                G. WANDSCHEER                1,976,869
                                CORN HUSKER
                            Filed April 30, 1932

Inventor
Gerrit Wandscheer
By Lynn H. Latta
Attorney

UNITED STATES PATENT OFFICE 1,976,869

CORN HUSKER

Gerrit Wandscheer, Sioux Center, Iowa

Application April 30, 1932, Serial No. 608,457

1 Claim. (Cl. 130—5)

My invention relates to a husking device.

An object of my invention is to provide means for removing husks and other parts generally remaining on the ears of corn, which ears of corn heretofore have traveled to the conveyor with a great deal of these miscellaneous parts attached.

A further object of my invention is to provide such means consisting of a fairly strong air suction which will draw the husks and finer material in the form of chaff away from the ears of corn.

With these and other objects in view, my invention consists in the construction, arrangement, and combination of the various parts of my device whereby the objects contemplated are attained, as hereinafter more fully set forth, pointed out in my claim, and illustrated in the accompanying drawing, in which:

Figure 1:
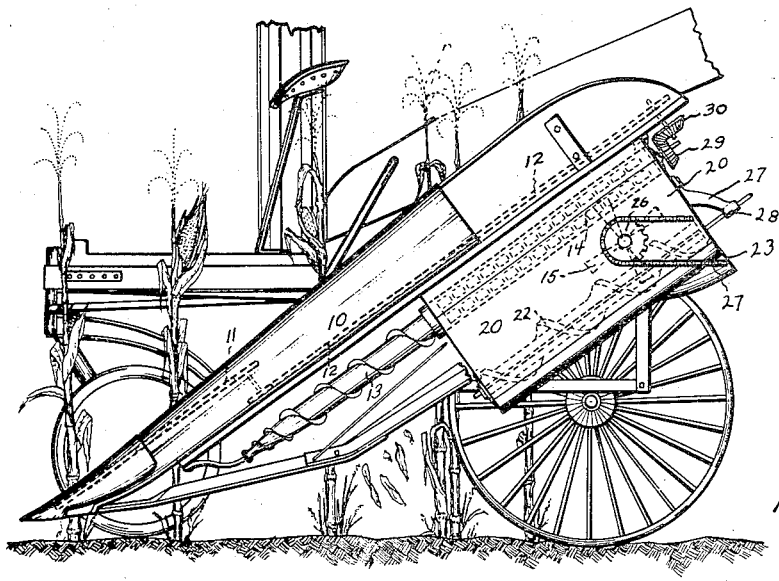
Figure 1 is a side elevation of the husker attached to the usual corn picker frame.

I have used the reference character 10 to indicate generally the gatherer's frame of a corn picker. This frame includes the usual sprocket chains 11.

The chains 11 remove the ear from the stalk and I provide the further chains 12 to convey the ears up through this frame.

A large share of the husks and so forth are carried through the snapping rolls 13, and the ears of corn which have been removed from the stalk are carried upwardly on the chains 12 where they drop into the usual chute at the end of this chain.

The chute arrangements and other details are not shown here since they do not play an important part in my invention.

After the ears of corn travel on the chain 12 along the upper part of the frame, they pass over the hollow cage-like rollers 14, which will be now explained.

Figure 3:
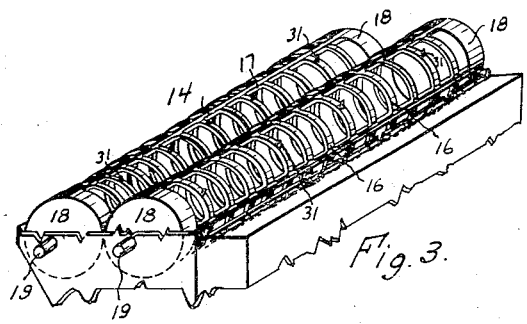
Figure 3 is an isometric view of the hollow rolls showing their cage-like structure.
Figure 2:
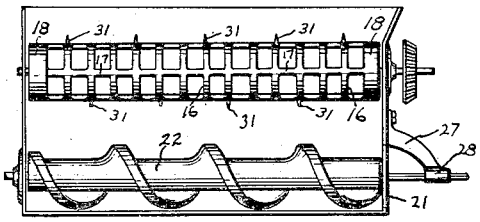
Figure 2 is a section taken generally along the line between the rolls.

These rollers are made of cast metal, preferably and have a cage-like structure as shown more specifically in Figure 3. They are made as strong and yet as light as possible and with a minimum amount of material so that the air suction created by a fan 15, will cause a rush of air between and directly through these rolls.

In substance, these rolls comprise a series of rings such as 16 joined together by longitudinal ribs 17, which are spaced 90 degrees apart. These rolls also include the solid end pieces 18 which carry the integral shafts 19, which are suitably journalled in the ends of the frame 20.

The frame 20 is of sheet metal completely inclosed with the exception of the openings 21 for carrying the loose corn from the usual type of spiral conveyor 22 and also the opening 23 through which is blown the chaff and other particles which are drawn from the corn by the fairly powerful suction of the fan 15.

The fan 15 is mounted on the shaft 24, which is journalled in the bearing 25, which bearing is suitably secured to the frame 20, and the shaft is driven in any manner known in the art and preferably from off the sprocket 26, which is pinned to the shaft 24 and which sprocket is driven from the sprocket chain 27, which is attached to any one of the power take-offs of the picker.

The screw conveyor for conveying loose kernels of corn is suitably journalled in the bracket 27 and in the bearing 28.

The opening 21 leads to the usual type of chute for conveying the corn.

The hollow air rolls are driven by suitable bevel gears 29 and 30, which are also driven from any convenient power take-off at some other point on the machine.

Of course each roll is driven from an individual set of gears, or sprockets, and the chains 12 are also driven from power take-offs in either way.

The rolls 14 also include the points 31 which are arranged at intervals on the periphery of the cylinder. These points are arranged on each roll so that as the roll rotates, they will engage adjacent openings of each other and are adapted to help tear off and carry through the rolls whatever husks and so forth drop off and are pulled through by means of the fan suction.

Figure 5:
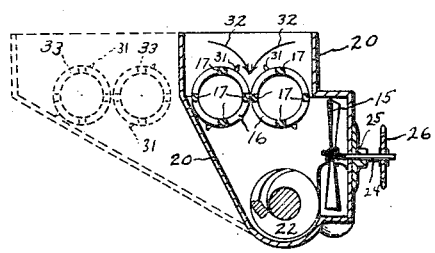
Figure 5 is a sectional view taken at right angles through the hollow rolls.

The rolls travel in the direction of rotation as shown by the arrows 32 in Figure 5, so that the material from the ears of corn will be carried between them.

It will be understood, of course, that two or more rolls can be used and still utilize the same principle.

This feature is shown in the dotted lines and shows the additional rolls 33 in Figure 5.

It will be understood that the housing 14 is practically all inclosed except the openings mentioned in order to insure a positive draft of air through the hollow rolls.

Figure 4:
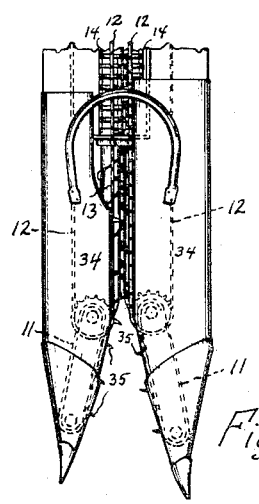
Figure 4 is a plan view of these rolls in the corn picker showing more generally the gatherers and the gatherer fingers and also the hollow rolls.

Referring to Figure 4, the gatherer arms are indicated generally by the characters 34 and the gatherer picks 35, and it will be seen from this figure that the hollow rolls 14 are directly beneath the conveying chains 12 so that as the corn travels along this chain 12, the operation as explained takes place.

The snapping rolls 13 can be driven from the same shafts which drive the hollow rolls.

It will be seen that I have provided an efficient mechanism for removing husks, chaff and so forth from off an ear of corn after the ears have been removed from the stalks by the snapping rolls, or chains, and it will also be seen that by the creation of a powerful suction of air I have efficiently removed all small particles and the like from off the corn and blown them away at the rear of the device.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A husking device comprising a casing, a plurality of cage-like rolls rotatably mounted within the casing, said rolls including integral tearing points, and said rolls presenting a maximum of hollow spaces along their horizontal planes to cause a maximum amount of air to be drawn therethrough, and means for drawing air directly through the rolls including a driven fan positioned directly beneath the rolls and mounted within the casing, said casing having a rear opening through which the air thus drawn is blown rearwardly, and said casing including screw conveying means rotatably mounted therein, adapted to function cooperatively with the said means.

GERRIT WANDSCHEER.